United States Patent Office 2,784,108

Patented Mar. 5, 1957

2,784,108

LUBRICANT AND METHOD FOR TREATING MOLDS

Robert A. Cupper, Forest Hills, Pa., assignor to Union Carbide and Carbon Corporation, a corporation of New York No Drawing. Application September 20, 1954, Serial No. 457,291

10 Claims. (Cl. 117—5.3)

This invention relates to glass molding and particularly to the "lubricants" applied to the mold surfaces which contact the molten glass, especially lubricants applied to the molds of machinery which automatically molds glass bottles, jars and the like.

In the molding of a bottle a "parison" or bottle blank is first formed by running a gob of fluid glass into a parison mold wherein the glass is formed somewhat into the shape of a bottle with a central depression to receive compressed air to expand the parison into the finished bottle in the bottle mold. In some operations, the ware may be blown partially into shape in the blank or parison mold (blow-blow operation). As soon as the parison has cooled sufficiently to withstand the manipulation, it is separated from the parison mold and transferred to the bottle mold where it is expanded by compressed air into its finished shape and thereafter allowed to cool until the glass is sufficiently strong to hold its shape without the support of the mold. In both of these molding operations the glass rolls along the walls of the mold and has a tendency to adhere to the walls of the molds giving an unevenly molded parison or bottle unless the walls of the molds are "lubricated."

It has been proposed to "lubricate" the walls of the molds with various types of oils and other media having colloidal graphite in suspension, the lubricant being swabbed or sprayed onto the mold surfaces. The oil in part decomposes and in part volatilizes due to the heat of the mold leaving a deposit of carbon and various decomposition products as well as a deposit of graphite. These deposits and the carbon-metal complex resulting from the absorption of the graphite into the metal of the mold, are the final parting media or lubricant which prevents the glass from adhering to the walls of the molds and enables the glass to roll along the walls. Undesirable features of oil are the carbon deposits which become too thick and too irregular and the decomposition products which remain on the mold and stain the glass, and the smoke which comes from the mold, the smoke being noxious to the operator and creating a fire hazard both in the form of vapors and in the form of a deposit of oil on the rafters and walls of the building.

It has been proposed to avoid the disadvantages of oil by lubricating the mold with an aqueous suspension of graphite but the water does not wet the surface of the hot mold and does not carry the graphite into the recesses of the mold; instead, the water becomes steam and blasts the graphite away from the surface of the mold, particularly in such recesses as the water may reach because of the confined space and added heat due to the adjacency of the walls of a recess.

It has been proposed to mix, just prior to spraying the mold walls, an oil suspension of graphite with a water dispersion of a soluble oil, for instance a petroleum sulfonate. This proposal is disadvantageous in that it requires complex equipment which is difficult to maintain; and soluble oils produce undesirable deposits on the blank equipment, particularly in the ring area. The lubricating composition of the present invention requires no special equipment, is used as a single fluid, and does not produce undesirable deposits.

It has also been proposed to prepare a lubricant comprising a mineral oil or a synthetic oil which has been proposed as a lubricating oil, an ester of a monohydric or a polyhydric alcohol or an ether alcohol for instance the ester of ethyl or isopropyl or amyl alcohol or glycol or the monomethyl, ethyl or ethylbutyl ether of ethylene glycol or the corresponding ethers of diethylene glycol with a fatty acid such as lauric, stearic, oleic or cerotic acids, and colloidal graphite. This proposed lubricant is unsatisfactory because it uses mineral or equivalent oil as the base fluid and such additives as are soluble in mineral oil and thus does not eliminate the smoke and fire hazard or the odor. An aqueous type mold lubricant based upon a synthetic lubricating oil prepared from butanol and a mixture of ethylene and propylene oxides and having a SUS viscosity of 100 at 100° F. gave an extremely noxious odor. The mixture of non-aqueous components of the composition of the present invention, except for the graphite, is soluble in water as opposed to a mixture containing mineral oil or equivalent; and the aqueous composition, which is the lubricating composition, presents no smoke or fire hazard or noxious odor.

According to the present invention, a preferred concentrate for a lubricant for glass molds and lubricants prepared from the concentrate by using from 3 to 25 parts by weight of the concentrate with from 97 to 75 parts by weight respectively, of added water, comprise:

TABLE 1

| | Parts by Weight | | |
|---|---|---|---|
| | Preferred Concentrate | Lubricant | |
| Propylene glycol | 42.4 | 2.403 | 20.025 |
| Hexylene glycol (2-methyl-pentane-diol-2, 4) | 37.7 | | |
| Polyethylene glycol 600 monooleate | 7.2 | .216 | 1.800 |
| Dextrose | 2.6 | .078 | .650 |
| Graphite suspension | 1.1 | .033 | .275 |
| Water-concentrate | 9.0 | .270 | 2.250 |
| Water-added | ---------- | 97.000 | 75.000 |

The glycols are collectively referred to as the "vehicle."

With respect to the glycols, ethylene glycol, the propylene glycols, butane diol 1,3 or 2,3 or 1,4, the pentane diols or the hexane diols may be used as equivalents, one replacing the other in whole or in part, it having been found that none of these glycols produce noxious odors. In general, other glycols or glycol ethers give undesirable odors. In the final aqueous lubricant the glycols act as vehicles and cause the lubricating portions of the fluid to spread over the mold surfaces and permit a period of "dwell" between the time that the aqueous lubricant is applied to the mold and the time at which the components volatilize. The amount of glycol or vehicle may be varied from about 1.4 parts to 24.7 parts by weight based upon 100 parts of the total dilute lubricant. If the vehicle is omitted the effect is to form a spotty and less adherent lubricant film.

Polyethylene glycol 600 monooleate is the monooleate ester of a polyethylene glycol wherein there are a sufficient number of ethylene oxide units to give the polyethylene glycol an average molecular weight of 600. Materials which may replace the oleate in the above formulae are polyoxyethylene sorbitan monolaurates, the lauryl ether of polyethylene glycols and the like. The ester or ether should contain a sufficient number of ethylene oxide units to make the compound essentially water soluble; and the esters or ethers may be and preferably are of the common fatty acids, for instance laurates, stearates, oleates and the like. In the final aqueous lubricant the esters or ethers are lubricants; and the amount thereof may be varied from about 0.2 part to 10 parts by weight in a total of 100 parts of the finished lubricant. The oleate may be substituted in whole or in part by the above and other polyoxyethylene fatty acid esters or polyoxyethylene alcohol ethers which are compatible with the remaining ingredients both as a concentrate and as a water diluted final lubricant. If the oleate or equivalent is omitted, the effect is to reduce the lubricating qualities of the final lubricant.

In the aqueous lubricant the dextrose acts as a binder and a carbon-former which remains on the mold surfaces. The amount of dextrose may be varied from about 0.075 part to 2 parts by weight in 100 parts of the diluted or finished lubricant. The dextrose may be substituted in whole or in part by sucrose, black-strap molasses, corn syrup or the like but dextrose is preferred as it induces greater dispersion stability of the graphite in both the concentrate and the aqueous lubricant. If the dextrose or equivalent is omitted the effect is to reduce the lubricating qualities of the fluid.

The graphite suspension referred to in the above formulae is 1 part by weight of colloidal graphite dispersed in 9 parts of butylene glycol. The graphite suspension supplies colloidal graphite to the concentrate and to the final lubricant. The amount of the suspension may be varied from about 0.025 part to 1 part by weight based on 100 parts by weight of the diluted lubricant. The suspension may be substituted by any material giving the equivalent amount of colloidal graphite but, if a graphite suspension is used, the suspending agent must be water soluble and soluble in the concentrate so that phases do not separate. To facilitate preparation of the concentrate and of the lubricant, the graphite is preferably added as a concentrated dispersion in a material which is compatible with water or with the other components of the lubricant; for instance, in the specified suspension the colloidal graphite is dispersed in water-soluble butylene glycol but a dispersion in diethylene glycol or other water-soluble glycols may be used. Graphite dispersions containing small amounts of various types of surface-active agents, particularly cationic agents or alkaline materials or the 1-ethanol-2-heptadecenyl derivative of glyoxalidene marketed as "Amine 220" may be used.

The water in the concentrate is preferably deionized or distilled or otherwise free of such electrical charge as causes the graphite to settle. In the concentrate the water stabilizes the composition so that the concentrate remains homogeneous and the water lowers the freezing point of the concentrate. However, although water is a preferred component of the concentrate, it may be omitted but in this case care should be taken that the concentrate is fluid and homogeneous when it is mixed with the water used to produce the final lubricant.

It is important that water be a component of the final lubricants contemplated herein. The water not only lowers the cost of the finished lubricant and assists in rendering the lubricant nonflammable but it facilitates applying to the surface of the molds the minute amount of lubricant which is required to lubricate the molds. But it is important that all of the components of the composition (except, of course, the graphite) be soluble or substantially so in water, either individually or in the composition as used, in order that the lubricant may be spread evenly over the mold. Where the lubricant is homogeneous, the volatiles volatilize quite easily, completely and uniformly from the surface of the mold leaving a lubricating film and neither the water nor the other components form droplets which explode into steam or vapors as water does when dropped on a hot plate. The monooleate partly volatilizes and partly decomposes. The dextrose decomposes forming carbon and aids in binding the graphite to the metal and the carbon from the dextrose also adheres to the metal. The aqueous lubricant does not form undesirable deposits and fewer mold changes due to build-up of the deposits are necessary. A result of using the aqueous lubricant disclosed herein is a uniform lubricating film on the surface of the mold and not spotty deposits of graphite such as occur when an aqueous suspension of graphite is used as the lubricant at high temperatures. The lubricant disclosed herein spreads evenly over the surface of the mold but it does not have the smoke-producing, high rate of carbon deposit, flammability, noxious odor, or other undesirable characteristics of oil. In the lubricants disclosed herein the graphite is held in uniform colloidal dispersion in both the concentrate and in the diluted concentrate which is used as the lubricant, either as a mold spray or a swabbing composition, and the diluted concentrate is applied to the mold as a homogeneous composition. Neither the concentrated lubricant whose formula is given above nor the diluted lubricant form excessive carbon deposits on either the ring, baffle or thimble, or plunger surfaces of the parison mold and thus do not form carbon deposits which ultimately chip off and create an uneven mold surface. When the lubricant is used there is a period of "dwell" between the application of the aqueous lubricant to the mold and the time at which the components volatilize and it is during this period of dwell that the composition wets the surface of the mold and carries the polyethylene glycol 600 monooleate, dextrose and graphite into any recesses which may be in the mold and holds dextrose and graphite on the mold surface where the carbon from the decomposing dextrose and the graphite can fill the pores of the metal of the mold surface to lubricate the mold.

In the final lubricant, the amount of non-aqueous components should generally not be lower than 15 parts by weight mixed with 85 parts by weight of water for press-blow operation. In the case of blow-blow operations, as little as 3 to 5 parts by weight of the preferred concentrate mixed with 97 to 95 parts of water may be used. Concentrations of the non-aqueous components higher than 25 parts by weight mixed with 75 parts of water may be used in the final lubricant but are uneconomical, the optimum concentration for general use to satisfy the most exacting demands being from 15 to 25 parts by weight of non-aqueous components with sufficient water to make 100 parts.

The oxidation or corrosion of the cast iron surface of the mold which takes place continuously at the high temperatures (316–482° C.) involved in making glassware is sometimes aggravated when spray lubricants containing water are used. This oxidation may be inhibited by the addition of small quantities of rust inhibiting materials for instance petroleum sulfonates or oxygenated hydrocarbons such as the methyl ester of mixed organic acids derived from oxygenated hydrocarbons. Tests made in conjunction with the lubricant disclosed herein have shown that sodium or potassium nitrite are excellent metal antioxidants or corrosion inhibitors and are preferably added to the water used in preparing the diluted lubricant so that the preferred concentration (about 0.05 to 0.1 percent nitrite by weight based on the contained water) can be maintained regardless of the degree of dilution selected by the user of the lubricant.

The temperature of the mold in the usual automatic glass molding machine is commonly between 316 and 482° C., and may be as low as 250° C. and as high as 600° C. The boiling points of the glycols are important. By varying the components within the limits previously described or the substitution of the equivalents which have previously been listed, various boiling ranges of the vehicle may be obtained, the components preferably giving a boiling range between 130° C. and 250° C. The combination of components previously given has a mild odor and the vapors are not smoky, nonflammable and nonirritating to the skin and eyes; and the graphite remains in suspension both in the concentrate and when diluted with water.

The conditions under which glass is molded are highly varied depending upon the types of machines used, the composition of the glass which somewhat determines the temperature range within which the mold must be maintained to have the glass flow easily in and fill the mold, the intricacy of the mold and the like. A concentrate of the formula previously given provides good all-purpose final lubricants of the formulae previously given when diluted with water as indicated. However, other concentrates and other lubricants may be prepared having the various components within the ranges given in the following Table 2, the concentration limits set for the concentrates giving the limits set for the diluted lubricant within the range of 3 to 25 percent by weight of concentrate used in the finished lubricant.

TABLE 2

| | Parts by Weight | | | |
|---|---|---|---|---|
| | Concentrate | | Diluted Lubricant | |
| | Maximum | Minimum | Maximum | Minimum |
| Vehicle—glycol | 90.0 | 46.67 | 24.7 | 1.4 |
| Fatty Ester or Ether | 40.0 | 6.67 | 10.0 | 0.2 |
| Sugar | 8.0 | 2.50 | 2.0 | 0.075 |
| Graphite Suspension | 4.0 | 0.83 | 1.0 | 0.025 |
| Water—Contained | 43.33 | 0.00 | | |
| Water—Total | | | 98.3 | 75.0 |

Other concentrates adapted to be diluted with about 75 parts of water to 25 parts of concentrate to give final lubricants with low and high vehicle content and having all components within the limits previously stated for the lubricant are:

TABLE 3

| | Parts by Weight | |
|---|---|---|
| | 1 | 2 |
| Vehicle—glycol | 9.6 | 98.8 |
| Fatty Ester or Ether | 0.86 | 0.8 |
| Sugar | 0.31 | 0.3 |
| Graphite Suspension | 0.13 | 0.1 |
| Water—Contained | 89.1 | None |

In general, for breaking in new molds maximum graphite and sugar are used until the mold surface is impregnated and maximum fatty acid ester or ether is used for lubrication. The glycol vehicle causes the lubricant to spread and form an even deposit; and thus if a mold has portions which are remote from the point at which the lubricant is applied to the mold or has depressions, for instance depressions which give raised letters and the like on a finished bottle, maximum vehicle is used. When the molds are well impregnated and broken in, the amount of graphite and sugar are reduced. The amount of fatty acid ester or ether is also reduced as the molds are broken in but as this component serves as a lubricant it is maintained at an intermediate level where the mold has depressions which may require extra lubrication. The amount of vehicle may be decreased somewhat as the mold is broken in but the amount of vehicle to be used depends more upon the type of mold and evenly spreading the lubricant over the mold surface and getting it into the remote portions of the mold than it does upon whether the mold is new or broken in. With these variations in the individual components it is generally desirable to use a lubricant with less water to break in new molds and where the molds require more lubrication, for instance in press-blow molding or where the molds are intricate and more water where the molds are well broken in or the mold is easily lubricated.

In plant tests, small wide-mouth jars were molded at the rate of 127 per minute. When the parison molds were sprayed with 1 part of the above preferred concentrate of Table 1 diluted with 4 to 6 parts by weight of water using sufficient of the spray to wet the mold surface, the rejects were only 2 to 5 pieces per 100 jars and the machine operated for 48 hours. The test terminated because of the limited amount of lubricant available. In a trial lasting for 2 months, twelve-ounce, narrow-neck, crown finish bottles were molded at the rate of 62 per minute using the preferred concentrate at a 10 to 1 dilution with water at an average efficiency of 98 percent. In a comparative test using a graphite-mineral oil mixture, only 56 units per minute could be made at about the same average efficiency. The efficiency is based on the percentage of rejects. The composition of the mineral oil-graphite mixture was: 100 SUS paraffinic oil+0.1 percent by weight colloidal graphite, the graphite being added as a 10 percent dispersion in mineral oil. The oil lubricant produced a disagreeable smoke and odor during the run whereas the lubricant described herein produced no smoke and no disagreeable odor. Blank mold changes (molds and neck rings) were necessary at 24 to 48 hour intervals when the mineral oil mixture was used but with the lubricant disclosed herein (1 part by weight of the preferred concentrate plus 10 parts of water) no changes were made for as long as one week. Where ethylene glycol monoethyl ether, the acetate of ethylene glycol monoethyl ether, the diethyl ether of diethylene glycol, propylene glycol monomethyl ether and mono-, di-, and tripropylene glycol methyl ethers were used to replace the propylene and hexylene glycols in the formulae of Table 1, the lubricants produced vapors having somewhat obnoxious odors. Glycerine developed a slight acrolein type odor and droplets flying from the hot molds produced a stinging sensation in the eyes.

What is claimed is:

1. A concentrate adapted to be diluted with water to give a lubricant for molds during the molding of glass, said concentrate consisting essentially of from about 9 to 99 parts by weight of a glycol containing from 2 to 6, inclusive, carbon atoms and having a boiling point from about 130° C. to 250° C., from about 0.8 to 40.0 parts of a member of the group consisting of esters and ethers containing an alkyl group having from 12 to 18, inclusive, carbon atoms and sufficient ethylene oxide groups to make said member substantially water soluble, from about 0.3 to 8.0 parts of a sugar and from about 0.1 to 4.0 parts of a suspension of colloidal graphite, the suspension of graphite containing about 10 parts by weight of colloidal graphite and 90 parts of a water miscible suspending agent.

2. A concentrate adapted to be diluted with water to give a lubricant for molds during the molding of glass, said concentrate consisting essentially of from about 9 to 99 parts by weight of a glycol containing from 2 to 6, inclusive, carbon atoms and having a boiling point from about 130° C. to 250° C., from about 0.8 to 40.0 parts of a member of the group consisting of esters and ethers containing an alkyl group having from 12 to 18, inclusive, carbon atoms and sufficient ethylene oxide groups to make said member substantially water soluble, from about 0.3 to 8.0 parts of a sugar, from about 0.1 to 4.0 parts of a suspension of colloidal graphite, and not more than 89 parts of water, the suspension of graphite containing about 10 parts by weight of colloidal graphite and 90 parts of a water miscible suspending agent.

3. A concentrate adapted to be diluted with water to give a lubricant for molds during the molding of glass, said concentrate consisting essentially of from about 9 to 99 parts by weight of a glycol containing from 2 to 6, inclusive, carbon atoms and having a boiling point from about 130° C. to 250° C., from about 0.8 to 40.0 parts of the oleic acid ester of a polyethylene glycol containing sufficient ethylene oxide units to give the glycol a molecular weight of about 600, from about 0.3 to 8.0 parts of dextrose, and from about 0.1 to 4.0 parts of a 10 percent suspension of colloidal graphite in butylene glycol.

4. A concentrate adapted to be diluted with water to give a lubricant for molds during the molding of glass, said concentrate consisting essentially of from about 9 to 99 parts by weight of a glycol containing from 2 to 6, inclusive, carbon atoms and having a boiling point from about 130° C. to 250° C., from about 0.8 to 40.0 parts of the oleic acid ester of a polyethylene glycol containing sufficient ethylene oxide units to give the glycol a molecular weight of about 600, from about 0.3 to 8.0 parts of dextrose, from 0.1 to 4.0 parts of a 10 percent suspension of colloidal graphite in butylene glycol and not more than 89 parts of water.

5. A lubricant adapted to be applied to molds used for molding glass consisting essentially of from about 1.4 to 24.7 parts by weight of a glycol containing from 2 to 6, inclusive, carbon atoms and having a boiling point from about 130° C. to 250° C., from about 0.2 to 10 parts of a member of the group consisting of esters and ethers containing an alkyl group having from 12 to 18, inclusive, carbon atoms and sufficient ethylene oxide groups to make said member substantially water soluble, from about 0.075 to 2.0 parts of a sugar, from about 0.025 to 1.0 part of a suspension of colloidal graphite and sufficient water to make 100 parts by weight, the suspension of graphite containing about 10 parts by weight of colloidal graphite and 90 parts of a water miscible suspending agent.

6. A lubricant adapted to be applied to molds used for molding glass consisting essentially of from about 1.4 to 24.7 parts by weight of a glycol containing from 2 to 6, inclusive, carbon atoms and having a boiling point from about 130° C. to 250° C., from about 0.2 to 10 parts of a member of the group consisting of esters and ethers containing an alkyl group having from 12 to 18, inclusive, carbon atoms and sufficient ethylene oxide groups to make said member substantially water soluble, from about 0.075 to 2.0 parts of a sugar, from about 0.025 to 1.0 part of a suspension of colloidal graphite, and from about 75 to 98 parts of water, the suspension of graphite containing about 10 parts by weight of colloidal graphite and 90 parts of a water miscible suspending agent.

7. A lubricant adapted to be applied to molds used for molding glass consisting essentially of from about 1.4 to 24.7 parts by weight of a glycol containing from 2 to 6, inclusive, carbon atoms and having a boiling point from about 130° C. to 250° C., from about 0.2 to 10.0 parts of the oleic acid ester of a polyethylene glycol containing sufficient ethylene oxide units to give the glycol a molecular weight of about 600, from about 0.075 to 2.0 parts of dextrose, from about 0.025 to 1.0 part of a 10 percent suspension of colloidal graphite in butylene glycol, and sufficient water to make 100 parts by weight.

8. A lubricant adapted to be applied to molds used for molding glass consisting essentially of from about 1.4 to 24.7 parts by weight of a glycol containing from 2 to 6, inclusive, carbon atoms and having a boiling point from about 130° C. to 250° C., from about 0.2 to 10 parts of the oleic acid ester of a polyethylene glycol containing sufficient ethylene oxide units to give the glycol a molecular weight of about 600, from about 0.075 to 2.0 parts of dextrose and from about 0.025 to 1.0 part of a 10 percent suspension of colloidal graphite in butylene glycol and from about 75 to 98 parts of water.

9. In the method of treatment of molds for molding glass, the steps which comprise wetting the surface of the mold at a temperature between about 250° C. and about 600° C. with a composition consisting essentially of from about 1.4 to 24.7 parts by weight of a glycol containing from 2 to 6, inclusive, carbon atoms and having a boiling point from about 130° C. to 250° C., from about 0.2 to 10 parts of a member of the group consisting of esters and ethers containing an alkyl group having from 12 to 18, inclusive, carbon atoms and sufficient ethylene oxide groups to make said member substantially water soluble, from about 0.075 to 2.0 parts of a sugar, from about 0.025 to 1.0 part of a suspension of colloidal graphite and from about 75 to 98 parts of water, the suspension of graphite containing about 10 parts by weight of colloidal graphite and 90 parts of a water miscible suspending agent, and holding the mold at a temperature at which the water volatilizes from the composition on the mold surface.

10. In the method of treatment of molds for molding glass, the steps which comprise wetting the surface of the mold at a temperature between about 250° C. and about 600° C. with a composition consisting essentially of from 1.4 to 24.7 parts by weight of glycol containing from 2 to 6, inclusive, carbon atoms and having a boiling point from about 130° C. to 250° C., from about 0.2 to 10.0 parts of the oleic acid ester of polyethylene glycol containing sufficient ethylene oxide units to give the glycol a molecular weight of about 600, from about 0.075 to 2.0 parts of dextrose, from about 0.025 to 1.0 part of a 10 percent suspension of colloidal graphite in butylene glycol and sufficient water to make 100 parts by weight, and holding the mold at a temperature at which the water volatilizes from the composition on the mold surface.

References Cited in the file of this patent

UNITED STATES PATENTS

| | | |
|---|---|---|
| 1,662,958 | Cranz | Mar. 20, 1928 |
| 1,735,120 | Lee | Nov. 12, 1929 |
| 2,245,747 | Barr | June 17, 1941 |
| 2,246,463 | Garratt | June 17, 1941 |
| 2,549,535 | Skooglund | Apr. 17, 1951 |
| 2,564,308 | Nagel | Aug. 14, 1951 |
| 2,586,211 | Currie | Feb. 19, 1952 |